April 6, 1937.　　　　　G. WAALKES　　　　　2,075,918
TURNTABLE
Filed Dec. 26, 1933　　　2 Sheets-Sheet 1
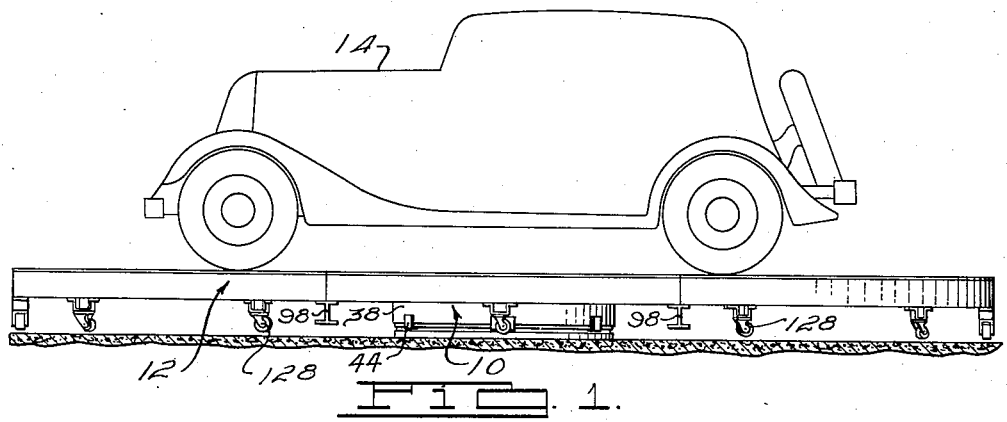
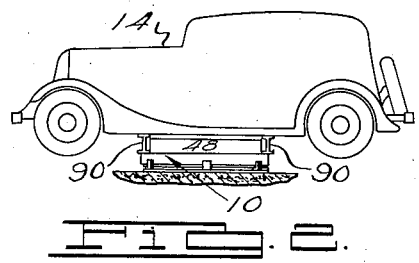
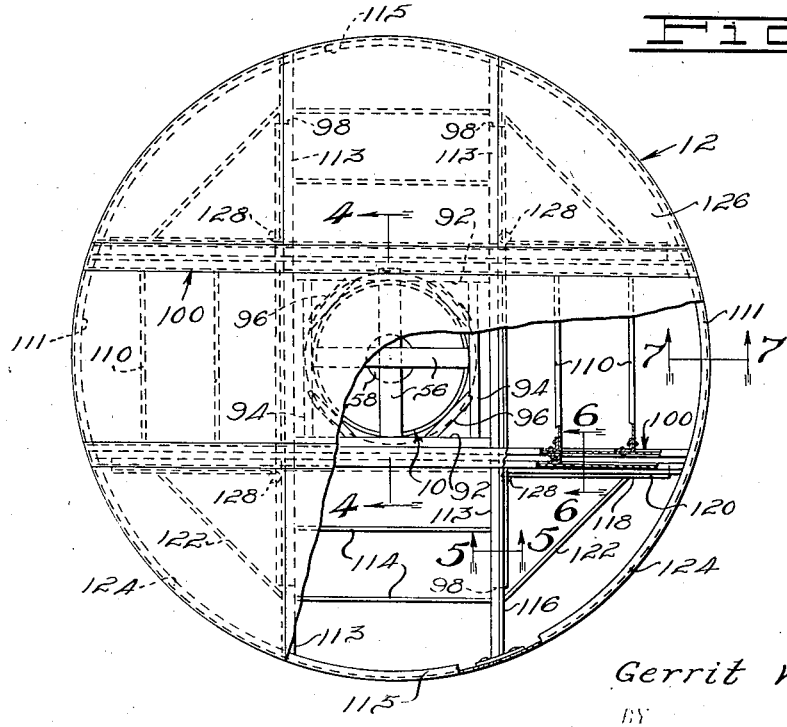
INVENTOR.
Gerrit Waalkes.
BY
ATTORNEYS.

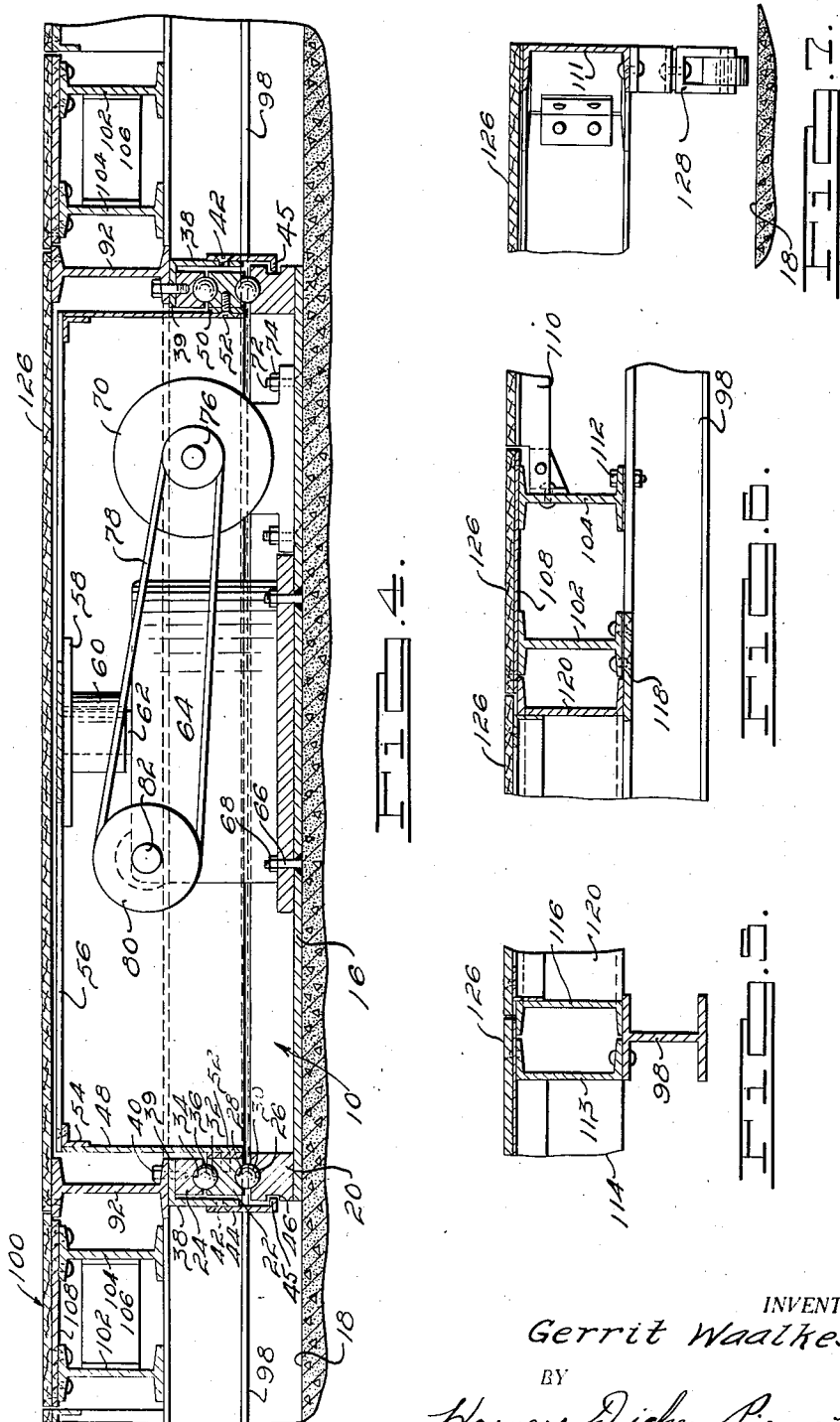

Patented Apr. 6, 1937

2,075,918

UNITED STATES PATENT OFFICE 2,075,918

TURNTABLE

Gerrit Waalkes, Highland Park, Mich., assignor to Anchor Steel & Conveyor Company, a corporation of Michigan Application December 26, 1933, Serial No. 703,897

10 Claims. (Cl. 104—44)

This invention relates to turntables and particularly to a construction therefor that is simple in construction, efficient in operation, and particularly designed to eliminate the break downs in service which conventional types of turntables are so commonly subject to.

Other objects of the invention are to provide a turntable in which the weight carrying portion thereof may be interrupted in its normal movement during operation of the turntable mechanism without interfering with the operative functions of the turntable mechanism or subjecting them to any undue strains or stresses; to provide a turntable mechanism in which the drive between the turntable and its driving mechanism is transmitted through rollable anti-friction members; to provide a turntable mechanism in which the weight supporting member of the mechanism is constrained toward equal rotation with a driving member substantially solely through the resistance to rolling set up by rollable members; to provide a turntable mechanism in which a driving member is interposed between the supporting member and the weight carrying member and is drivingly connected to the weight carrying member by means of rolling anti-friction means; and to provide a turntable mechanism including a supporting member, a driving member, and a driven member, superimposed with respect to each other, and the supporting member and the driven member being separated by the driving member, opposed faces of adjacent members being formed to provide tracks for rollable anti-friction members, and rollable anti-friction members being disposed between said tracks and transmitting the load between the members.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views,—

Figure 1 is a side elevational view of a suitable embodiment of my improved turntable showing in a more or less diagrammatic manner an automobile supported thereon.

Fig. 2 is a reduced side elevational view of a modification of the construction shown in Fig. 1, and in which the platform employed in connection with the construction shown in Fig. 1 is eliminated and the automobile supported by the turntable mechanism in a different manner.

Fig. 3 is a reduced partially broken, partially sectioned plan view of the turntable shown in Fig. 1 with the automobile removed therefrom.

Fig. 4 is an enlarged, vertical sectional view taken through the central portion of the turntable shown in Figs. 1 and 3 as on the line 4—4 of Fig. 3.

Fig. 5 is an enlarged fragmentary vertical sectional view taken on the line 5—5 of Fig. 3.

Fig. 6 is an enlarged fragmentary vertical sectional view taken on the line 6—6 of Fig. 3.

Fig. 7 is an enlarged fragmentary vertical sectional view taken on the line 7—7 of Fig. 3.

Turntable mechanisms may, of course, be provided in any case where it is desired to rotatably support an object without material bodily displacement from a particular spot or location. In recent years the use of turntables for rotatably supporting articles or objects for sales display purposes has considerably increased, and although the application of the present invention is broadly applicable to the entire field of application of turntables, it has been particularly designed with a view of overcoming a material disadvantage particularly applicable to turntables employed for display purposes. As a matter of illustration only of one application of the broad invention, the following discussion will be substantially limited to the application of the invention for the purpose of rotatably supporting an automobile for display purposes, and it will be readily apparent to those skilled in the art from the following description of the one specific application of the present invention, how the invention may be applied to other specific uses as well as the advantages that will flow therefrom.

In supporting an automobile upon a turntable for display purposes it is usually desirable to rotate the turntable at a speed of one revolution every one to five minutes, preferably at a speed of about one revolution every three minutes. Obviously, the most convenient source of power for rotating the turntable is an electric motor and preferably an electric motor of a standard type which may rotate at a speed of somewhere in the neighborhood of 1000 to 1800 R. P. M. Accordingly, it is apparent that a very high reduction between the speed of the motor and the speed of the turntable must be provided. The conventional method of rotating such turntables is to provide the turntable with a central power shaft and to connect the electric motor to such shaft through a suitable speed reduction mechanism of conventional construction. Where a turntable is provided for supporting an automobile for display purposes the diameter of the platform will usually range between fourteen and eigheeen feet and, accordingly, it will be obvious that a relatively small amount of resistance exerted at the periphery of the turntable will, if not otherwise provided for, exert a tremendous amount of resistance in the line of drive between the driving motor and the central drive shaft of the turntable.

In conventional constructions of the type heretofore provided for the purpose described, a positive line of drive has been provided between the driving motor and the turntable platform and in order to overcome possible breakage of major parts of the drive mechanism, a shear pin has been put in the line of drive between the driving motor and the central driving shaft of the turntable so that should an excessive amount of resistance be applied to the periphery of the turntable platform, the shear pin will be sheared and thus disconnect the platform from the driving motor before a sufficient amount of force has had an opportunity to build up in the line of drive to cause a breakage or other damage of a major member thereof.

Because of the fact that objects of the type usually displayed on turntables are more or less of intense interest to the public in general, it is common and even desired that people shall crowd around the turntable to view the objects supported thereon, and if not specifically and carefully guarded against a spectator may inadvertently lean or otherwise contact against the slowly moving periphery of the turntable platform and momentarily offer a sufficient resistance to the rotation thereof to shear the shear pin and thus place the turntable mechanism out of operation until the shear pin is replaced. Usually the replacement of a shear pin involves a material amount of time and trouble for the reason that the driving mechanism for the turntable is generally located closely adjacent the center thereof and the turntable platform is usually located as close to the floor of the display room as is conveniently possible. Also, as is evident, the moment that the turntable is thus put out of commission and its rotation ceases the attractiveness of the display and, accordingly, the interest of the spectators immediately drops, so that interruption of the operation is really of considerable consequence.

Such breakdowns of conventional turntable constructions have in the past been so frequent that considerable time and effort have been spent in an attempt to overcome the disadvantages thereof, and the construction provided in accordance with the present invention is designed primarily to eliminate such disadvantages.

Referring now to the accompanying drawings, in Fig. 1 is shown a turntable including a driving and supporting unit indicated generally at 10 upon which is carried a platform indicated generally at 12. As a matter of illustration only, an automobile 14 is shown as being supported on the platform 12, the platform 12 being of a materially greater diameter than the length of the automobile 14 mainly for the purpose of effectiveness of display. It may not be necessary and may not be desirable in certain cases to employ the platform 12, in which case the automobile 14 may be supported directly upon the unit 10 in the manner suggested in Fig. 2. In either case the advantages of the main feature of the present invention will be realized as this has particularly to do with the arrangement and construction of the unit 10.

Referring now particularly to Fig. 4, it will be noted that the unit 10 comprises a circular metallic disc 16 which may rest directly upon a floor or other surface 18. Supported on and suitably fixed to the disc 16 is a metallic ring or annulus 20 above which is located a second ring or annulus 22 of substantially the same diameter as the ring 20. Positioned in turn, above the ring 22, is a third ring or annulus 24 of substantially the same diameter as the rings 20 and 22. The opposed faces of the rings 20 and 22 are formed to provide centrally thereof opposed circular grooves 26 and 28 respectively of approximately semi-circular cross section and between which a plurality of balls 30 are received, the balls 30 preferably being present in sufficient numbers as to completely fill these grooves, and of a size to approximately fit the grooves and to maintain the rings 20 and 22 out of actual contact with each other at all times.

The rings 22 and 24 are likewise provided with similar opposed grooves 32 and 34 respectively in their opposed faces between which similar balls 36 are received in a similar manner and which thus maintain the rings 22 and 24 out of contact with each other. The balls 30 and 36 are, of course, adapted for rolling contact with both the rings 20 and 22 and the rings 22 and 24 respectively and, therefore, provide rolling anti-friction means between the corresponding rings. Thus the ring 22 is free to rotate with respect to the ring 20 and the ring 24 is free to rotate with respect to the ring 22, the only resistance to such rotation being the frictional resistance to rolling of the balls 30 and 36 which, of course, is relatively small.

In order to prevent sufficient axial displacement of the rings 20, 22 and 24 in service to allow displacement of the balls 30 and 36, a ring member 38 of slightly larger diameter than the ring 24 is positioned around the rings 22 and 24 in outwardly spaced relation thereto and is provided at its upper edge with an inwardly turned flange 39 which overlies the upper surface of the ring 24 and is secured in place thereon by bolts 40 which also serve an additional purpose to be later described. A plurality of bracket members 44 (shown as four in number) are secured to the outer face of the ring member 38 in equally angularly spaced relation and project downwardly therefrom. The lower end of each bracket member 44 is provided with a horizontally disposed and relatively short leg 45 which projects radially inwardly therefrom into a peripheral groove 46 provided in the periphery of the lower ring 20. The groove 46 is of such proportion that when the apparatus is in its normal operative position the inwardly projecting legs 45 of the bracket members 44 are located in amply spaced relation with respect to the walls of the groove 46 and are adapted to contact therewith only under exceptional conditions, as for instance, when an excessive load is applied to an extreme edge of the turntable platform or when it is attempted to pick up the turntable through one of the races 22 or 24. However, it may be noted that the rings 20, 22 and 24, where the turntable is to be employed for supporting automobiles as herein considered, are preferably of a diameter between three and four feet so that the turntable will be able to withstand a considerably large off-center weight distribution thereon without becoming cocked, and accordingly the ring member 38 and brackets 44 will serve mainly to prevent separation of the parts during handling.

A relatively deep ring member 48 projects downwardly into the assembly of the rings 20, 22 and 24 to a position substantially flush with the lower edge of the ring 22 from which it is spaced by a spacing member 50 and to which it is secured by screws 52. The ring 48 projects upwardly a material distance above the upper ring 24 and is provided on its inner surface adjacent its upper edge with four equally angularly spaced angle brackets 54 which serve as a means for securing and supporting the cross 56 thereon. The cross 56, as best indicated in Fig. 3, has four radially extending arms the outer ends of which rest on and are secured to corresponding brackets 54. The central portion of the cross 56 is fixed to the flange 58 on the hub 60 which in turn is non-rotatably secured to the vertically extending driven shaft 62 of a speed reduction mechanism indicated generally at 64. This speed reduction mechanism may be of any conventional type such as may be bought on the open market, the only important requirement being that it is capable of providing the desired ratio of reduction between the driving motor and the turntable. In the present instance the speed reduction unit 64 is shown as being supported on the disc or base 16 and secured in place thereon by means of bolts 66 and nuts 68.

A driving motor 70 is also located within the ring assembly 20, 22 and 24 and is secured to the base 16 by bolts 72 and nuts 74, it being provided with a pulley 76 which drivingly engages a belt 78 also trained over a pulley 80 fixed to the driving shaft 82 of the speed reduction unit 64.

From the description so far given it will be apparent that rotation of the motor pulley 76 will result in a corresponding lower rate of rotation of the driven shaft 62 of the speed reduction unit 64 and rotation of the shaft 62 will cause equal rotation of the cross 56, ring member 48 and ring member 22. In accordance with the present invention the weight to be supported by the turntable is conducted to the upper ring member 24 which, as will be apparent, is connected with the driven element 22 of the turntable only through the intermediary of the balls 36. The weight imposed upon the ring 24 will, of course, be transmitted through the balls 36 to the driven ring 22 and thence from the driven ring 22 through the balls 30 to the supporting ring 20 and thence to the floor 18. The driven ring 22 is, therefore, capable of being rotated by the driving mechanism even though both rings 20 and 24 are stationary and the only resistance which will be offered to such rotation of the driving ring 22 will be the rolling friction of the balls 30 and 36 in their respective grooves and which resistance, as will be obvious, will be relatively negligible in a properly designed structure.

If no resistance is offered to rotation of the ring 24 while the ring 22 is rotated, the ring 24 will, of course, rotate equally with the ring 22 and in such case the only resistance that the driving mechanism must overcome is the rolling friction of the lower balls 30. The rolling friction of the upper balls 36 in such case will cause the upper ring 24 to rotate therewith together with any objects that may be supported on the upper ring 24. While the ring 24 and any objects supported thereby is rotating with the ring 22 it will be apparent that should the rotation of the upper ring 24 and the objects supported thereby be restrained from such rotation, or varied in rate of rotation with respect to the ring 24, the only added resistance that will be placed upon the driving mechanism will be the added rolling resistance of the balls 36 in their respective grooves and, in view of the fact that in a properly designed structure this rolling resistance of the balls 36 will be so small as to be negligible from all practical purposes, the driving mechanism will continue to drive the driving ring 22 as though no such variation in their relative rate of rotation between the rings 22 and 24 had occurred. Accordingly, no damage to the line of drive between the motor 70 and the ring 24 can possibly occur in this construction because of stoppage of the platform. As soon as any such resistance to the rotation of the ring 24 and the objects carried thereby is relieved, the ring 24 will again rotate equally with the ring 22, although a slight initial rolling of the balls 36 may occur until the rolling friction thereof has had sufficient time to overcome the static inertia of the ring 24 and the object carried.

From the above it will be obvious that by the mechanism herein provided a unitary structure is produced in which the disadvantages of conventional constructions as previously pointed out are entirely and effectively overcome. At the same time not only are such disadvantages overcome but important advantages thereover result from the construction. An instance of one such advantage may be illustrated in connection with the case where, as a matter of illustration, it is desired to show a plurality of automobiles in succession upon the turntable at relatively short time intervals, in which case the speed with which an automobile may be removed from the turntable and replaced by another is of importance. If a conventional construction was employed under such circumstances and made one complete revolution every three minutes, it will be observed that under certain circumstances it might be necessary to wait substantially three minutes for the turntable to bring the automobile into the proper position for unloading after the signal had been given to unload. Under such circumstances, by the employment of the present invention, regardless of the rotatable position of the automobile on the turntable the platform may in such case be manually turned to bring it to the required location in a fraction of the time which would be required if it was necessary to await the proper degree of rotation of the turntable by the driving means. Obviously, other similar conditions may arise where the ability to turn the turntable either in advance of or in a direction opposite to the direction of rotation of the driving means will be of utmost advantage.

It has been previously mentioned that with this construction the weight of the object to be carried by the turntable is transmitted to the upper ring member 24 and then through the ring members 22 and 20 to the primary supporting surface. Any suitable means may of course be provided in accordance with the broader aspects of the present invention for transferring the weight of the object to be carried to the ring member 24. An extremely simple method is disclosed in Fig. 2 wherein is illustrated a means for supporting an automobile 14 on the turntable without the employment of a platform such as the platform 12 previously referred to. In this particular case a pair of longitudinally spaced bars or beams 90 is shown as being positioned transversely of the length of the automobile 14 and so arranged, for instance, as to contact the lower edges of the chassis frame (not shown) of the automobile 14 and so spaced longitudinally of the automobile as to straddle the ring 48 and rest upon the upper surface of the ring 24 at diametrically opposite points thereon. In such case the beams 90 may be secured either to the automobile 14 or to the ring 24.

Ordinarily it is desirable that the turntable be provided with a supporting platform and the figures of the drawings, with the exception of Fig. 2, illustrate a novel type of platform forming the subject matter of my co-pending application for Letters Patent of the United States filed July 5, 1935, Serial No. 298,865, the same being a division of the present application. Such platforms, as will be readily recognized, because of the relatively large amount of overhang which they are liable to have with respect to the unit 10 must be of extremely substantial construction particularly where they are to support a relatively heavy weight such as an automobile. For this reason, these platforms are usually of relatively heavy construction and present a serious problem in connection with their transportation, particularly where it is desired to move the turntable and the platform from place to place at more or less frequent intervals. In accordance with the present invention the platform is so constructed that it forms a complete unit built up of a plurality of separate or subsidiary units or assemblages each of which as a unit may be applied to or removed from the main unit. In accordance with a still further phase of the present invention, each of these separate subsidiary units is preferably provided with castors or the like whereby as each subsidiary unit is disconnected from the main unit it is provided with its own independent wheels or rollers permitting it to be manually handled and moved with ease. Additionally, these castors are preferably so located with respect to the platform that although they are ordinarily out of contact with the supporting surface for the turntable during normal operation thereof, should the platform become momentarily cocked or displaced from its true normal position as, for instance, by the mere application of an unusual load on one edge thereof, the castors will contact with the supporting surface and limit the tilting movement of the platform until such condition is corrected.

Referring now particularly to Figs. 3 and 4, it will be noted that a pair of parallel I-beams 92 are disposed on diametrically opposite sides of the unit 10 and rest on the upper face of the flange 39 seated upon the upper ring 24 and are secured in position thereto by the bolts 40 which, as previously explained, are employed for securing the ring member 38 in place. Arranged on diametrically opposite sides of the unit 10 in perpendicular relationship with respect to the beams 92 is another pair of parallel I-beams 94 resting on the upper face of the flange 39 and secured to the ring 24 by the bolts 40 previously described. The beams 94 are of a length to fit between the beams 92 and are secured thereto at their ends. Angularly disposed corner bracket members 96, preferably of angle or beam-like formation, interconnect the adjacent ends of the beams 92 and 94 and also rest upon and are secured to the upper surface of the flange 39. Thus the members 92, 94 and 96 form an octagonal frame which surrounds the ring 48 in outwardly spaced relation with respect thereto and seats upon and is secured to the upper face of the ring 24 through the intermediary of the flange 39.

Referring to Fig. 3, it will be noted that the members 92 project outwardly beyond the beams 94, and secured to the under face of the outwardly projecting ends and in perpendicular relation to the length thereof are two parallel I-beams 98 disposed on opposite sides of the unit 10 and terminating short of the periphery of the table 12. Supported transversely of the beams 98 and resting on the upper surfaces thereof on opposite sides of the unit 10 are two longitudinally unbroken track members indicated generally in Fig. 3 as at 100. Each of these track members, as best indicated in Fig. 4, comprises a pair of spaced parallel I-beams 102 and 104 the webs of which are joined together by bracket members 106. The track members 100 extend across the full width of the platform 12 and the upper flanges of each of the I-beams 102 and 104 thereof are connected together by a metal plate 108 which not only acts to further tie the I-beams 102 and 104 together and enhance the general strength of the structure but also to form direct weight supporting surfaces for the wheels of the automobile which is to be mounted upon the platform. It may be noted in passing that the upper surfaces of the I-beams 102 and 104 are preferably flush with the upper surfaces of the I-beams 92, 94 and 96 which in turn are preferably slightly elevated with respect to the upper surfaces of the cross 56. The inner I-beams 104 of the track 100 are connected together by cross members 110 and end members 111 curved to conform to the peripheral curvature of the platform and, in view of the fact that the track members 100 are removably secured to the beams 98 by suitable means such as bolts 112 (see Fig. 6), the track members together with their cross connecting members 110 and 111 form a unitary assemblage which is applicable to and removable from the assembly as such.

Resting upon and secured to the upper face of each of the beams 98, between the tracks 100 and also outwardly of the tracks 100, are channel members 113. Referring to Fig. 5, it will be noted that the channel members 113 are so positioned that the free edges of their flanges are located in substantially the plane of the web of the corresponding beam 98, and as indicated best in Fig. 3 the channels 113 on opposite sides of the unit 10 and outwardly of the tracks 100 are connected together by cross members 114 and end members 115 curved to conform to the peripheral curvature of the turntable. By reason of the fact that the channels 113 are connected to the beams 98 and the beams 98 are secured to the beams 92, 94 and 96, and the beams 92, 94 and 96 are removably secured to the ring 24 of the unit 10, these members in turn form another unitary assemblage applicable to and removable as such from the unit 10 and remainder of the turntable.

Each of the upper surfaces of the beams 98 outwardly of the tracks 100 and on that side thereof unoccupied by the channels 113 serves as a supporting surface for a channel member 116 positioned in opposed relation to the corresponding channel member 113. As indicated best in Fig. 6, outwardly of the beams 98 the lower faces of the beams 102 are provided with plates 118 which project outwardly therefrom with respect to the corresponding beam 104. Upon the outwardly projecting portion of each of the plates 118 is removably received a channel member 120 which extends inwardly and is joined to the inner end of the corresponding channel 116. Corresponding channels 120 and 116 are joined by a diagonal brace 122 intermediate their ends and their outer ends are connected by the curved channel member 124 forming a portion of the periphery of the platform. As will be observed, each of the channels 116 with its cooperating channel 120, brace 122 and segment 124 forms a unitary assemblage applicable to and removable from the turntable as such. A wooden or other covering 126 is preferably provided for each of the unitary assemblages forming a part of the whole turntable platform as above described, and this covering is preferably so shaped that when assembled in place on a completed turntable platform a substantially unbroken surface is presented.

Although not essential, if desired each of the curved channel members 111, 115 and 124 may be provided with two or more downwardly projecting castor assemblies 128 on the lower face thereof, and each of the segmentally shaped corner assemblies including the channels 116 and 120 and members 122 provided with one such castor at the juncture of the channels 116 and 120. These castors are of such a height that during normal operation of the turntable they are materially spaced from the floor 18 so as to be perfectly free of contact therewith, and are provided mainly for the purpose of providing rollers or wheels for the individual assemblies going to make up the turntable platform so that each of these assemblies, when the platform is disassembled, may be rolled to a desired location on the castors without requiring additional means for supporting the weights of these assemblies. In view of the fact that these assemblies are each relatively heavy and oftentimes difficult to handle the castors thus materially aid in the facility with which the turntable may be transported from place to place.

The castors 128 do form an added function when the platform is assembled in that should, for some reason or other, an unusual amount of weight be applied to one edge of the turntable the castors will contact with the floor 18 before the platform 12 has become cocked to such a degree as to cause damage to the mechanism, and in this manner they serve an added safety function. It is to be understood, however, that contact of the castors 128, except in such unusual conditions as above described, is never desired during operation of the turntable for the reason that the drag at the periphery of the platform which would thus be set up by contact of one or more of the castors 128 with the floor 18 would in many cases be sufficient to overcome the rolling friction of the upper row of balls 36 and thereby stop rotation of the platform 12.

From the above it will be observed that in accordance with the present invention a turntable mechanism is provided in which interruption of the normal rotation of the turntable weight supporting members, or the platform if provided thereon, will under no circumstance have any effect whatsoever upon the continued proper function of the drive mechanism, and permits the turntable to be rotated in either direction and at any desired rate of rotation independent of the continued normal driving effort of the driving mechanism. It will also be understood that in addition to the above described phase of the present invention the invention further provides a platform structure of novel formation by means of which a platform may be quickly assembled and/or disassembled and the unitary parts thereof transported with ease and dispatch.

Formal changes may be made in the specific embodiment of the invention described without departing from the spirit or substance of the broad invention, the scope of which is commensurate with the appended claims.

What I claim is:

1. In a turntable mechanism, in combination, a ring-like base provided with an annular track, a ring-like driving member provided with an annular track in opposed relation to the first mentioned track, rolling anti-friction means disposed between and directly contacting both said tracks, said driving member being provided with a second annular track, a weight supporting member provided with a track in opposed relation to said second track, rolling anti-friction between and directly contacting both the two last mentioned tracks, and means for rotating said driving member.

2. In a turntable structure, in combination, a ring-like base adapted to seat directly on a floor and provided with an upwardly facing annular track, a weight supporting member having an annular track concentric with and opposed to the first mentioned track, rolling anti-friction members disposed between said tracks and transmitting weight from one to the other, said member having an upwardly facing annular track thereon, a weight supporting member having a downwardly facing annular track thereon opposed to the third mentioned track, rolling anti-friction means disposed between said third mentioned and the fourth mentioned tracks and transmitting weight from one to the other, a driving motor, and a gear reduction mechanism disposed within said base driven by said motor and operatively connected to said member for rotating the same, the connection between said member and mechanism being such as to relieve said connection of any material weight supporting functions.

3. In a turntable, in combination, a base, a vertical drive shaft journaled on said base, a rotatable member supported on said base independently of said drive shaft, means fixedly connecting said drive shaft and rotatable member, and weight receiving means rotatably carried by said rotatable member.

4. In a turntable, in combination, a base, a drive shaft journaled on said base, a member rotatably supported on said base independently of said drive shaft, means connecting said drive shaft and member for rotation together, and a weight supporting device rotatably carried upon said member by anti-friction means, the frictional resistance to rolling movement of said anti-friction means constituting the sole driving force between said member and weight supporting device.

5. In a turntable, in combination, a weight supporting member having an annular roller race on its under side, a base having an annular roller race, a driving ring positioned intermediate said member and base and having upper and lower roller races adapted to cooperate respectively with said races in the member and base, rolling means in said races between the member and ring and between the ring and base respectively, and means positioned within said ring for rotating said ring.

6. In a turntable, in combination, a weight supporting member having an annular roller race on its under side, a base having an upwardly facing annular roller race in juxtaposition with the race on said member, a driving ring positioned intermediate said member and base and having upper and lower axially aligned roller races adapted to cooperate respectively with said races in the member and base, rolling means in said races between the member and ring and between the ring and base respectively, and means positioned within said ring for rotating said ring.

7. In a turntable, a base, a supporting and driving member carried by said base, a weight supporting device supported upon said member by roller bearing means, said roller bearing means comprising a plurality of rolling elements positioned in a common plane and constituting the sole connection between said member and device, and rotatable means on said device adapted to engage said base when said device is tilted with respect to said member.

8. In a turntable mechanism, in combination, a base member provided with an annular track, a driving element, rolling anti-friction means between said track and said driving element, said driving element also having a track, a weight-supporting member, rolling anti-friction means between the last mentioned track and said weight-supporting member, and a plurality of means preventing inadvertent relative axial displacement of said element and said member, each of said means having a portion secured to one of said members and another portion normally freely disposed in a groove in the other of said members.

9. In a turntable mechanism, in combination, a base member provided with an annular track, a driving element, rolling anti-friction means between said track and said driving element, said driving element also having a track, a weight-supporting member, rolling anti-friction means between the last-mentioned track and said weight-supporting member, and means secured to one of the members and normally extending freely into a horizontally opening groove in the other of said members for preventing inadvertent axial displacement of said members.

10. In a turntable mechanism, a turntable, a driving member rotatable on the axis of the turntable, and an annular series of rolling elements between said turntable and said member, said rolling elements constituting the sole connection between the turntable and member and being located at a substantial distance from said axis whereby the drive is transmitted solely through rolling friction applied to the turntable at a substantial distance from its axis.

GERRIT WAALKES.

CERTIFICATE OF CORRECTION.

Patent No. 2,075,918.  April 6, 1937.

GERRIT WAALKES.

It is hereby certified that error appears in the printed specification of the above numbered patent requiring correction as follows: Page 4, first column, line 17, for the serial number "298,865" read 29,865; and that the said Letters Patent should be read with this correction therein that the same may conform to the record of the case in the Patent Office.

Signed and sealed this 25th day of May, A. D. 1937.

(Seal)

Henry Van Arsdale
Acting Commissioner of Patents.